(12) United States Patent
Nakanishi et al.

(10) Patent No.: US 7,571,491 B2
(45) Date of Patent: Aug. 4, 2009

(54) TELEVISION RECEIVER AND ELECTRONIC DEVICE

(75) Inventors: Hirokazu Nakanishi, Osaka (JP); Koji Uetsuki, Osaka (JP); Masatoshi Ishida, Osaka (JP)

(73) Assignee: Panasonic Corporation, Osaka (JP)

( * ) Notice: Subject to any disclaimer, the term of this patent is extended or adjusted under 35 U.S.C. 154(b) by 247 days.

(21) Appl. No.: 10/588,608

(22) PCT Filed: Feb. 4, 2005

(86) PCT No.: PCT/JP2005/001719

§ 371 (c)(1),
(2), (4) Date: Aug. 7, 2006

(87) PCT Pub. No.: WO2005/081518

PCT Pub. Date: Sep. 1, 2005

(65) Prior Publication Data

US 2007/0172056 A1  Jul. 26, 2007

(30) Foreign Application Priority Data

Feb. 5, 2004 (JP) .............................. 2004-029077

(51) Int. Cl.
- G08B 13/00 (2006.01)
- G06F 11/30 (2006.01)
- G06F 12/14 (2006.01)
- H04N 7/16 (2006.01)

(52) U.S. Cl. .............................. 726/34; 726/35; 725/25; 725/26; 713/194

(58) Field of Classification Search ................... 726/36; 725/26

See application file for complete search history.

(56) References Cited

U.S. PATENT DOCUMENTS

| 5,051,601 | A | * | 9/1991 | Atobe et al. ................. 250/551 |
| 5,185,794 | A | * | 2/1993 | Thompson et al. .......... 380/235 |
| 5,243,647 | A | * | 9/1993 | Parikh et al. ................. 380/241 |
| 5,243,651 | A | * | 9/1993 | Parikh et al. ................... 380/2 |
| 5,267,312 | A | * | 11/1993 | Thompson et al. .......... 380/237 |
| 5,406,627 | A | * | 4/1995 | Thompson et al. .......... 380/237 |
| 5,877,697 | A | * | 3/1999 | Paas et al. .................. 340/5.31 |

(Continued)

FOREIGN PATENT DOCUMENTS

JP  10-105473  4/1998

(Continued)

*Primary Examiner*—Christian LaForgia
(74) *Attorney, Agent, or Firm*—Steptoe & Johnson LLP

(57) ABSTRACT

In a television receiver having a decryption unit and a video display unit which are stored in one casing, copyright protection is given to an encrypted digital video signal or analog video signal.

When an encrypted digital video signal is inputted to a digital video signal input terminal, the signal is decrypted by a decoding circuit to obtain an after-decryption video signal that is copiable, and thereafter, the signal is visualized by a video display unit. When a casing cover is opened, a decoding control circuit converts a parameter that is needed for decryption, such as an encryption key, into a meaningless parameter, and outputs it to the decoding circuit, whereby the after-decryption video signal becomes a video signal that is not decrypted.

On the other hand, during maintenance, a predetermined code is inputted from a button group (18) to output a regular decryption parameter to the decoding circuit (13).

2 Claims, 9 Drawing Sheets

U.S. PATENT DOCUMENTS

| | | | |
|---|---|---|---|
| 6,175,925 B1 * | 1/2001 | Nardone et al. | 726/22 |
| 6,388,574 B1 * | 5/2002 | Davis et al. | 340/568.1 |
| 6,396,400 B1 * | 5/2002 | Epstein et al. | 340/550 |
| 2004/0187035 A1 * | 9/2004 | Schwan et al. | 713/202 |

FOREIGN PATENT DOCUMENTS

| | | |
|---|---|---|
| JP | 11-238017 | 8/1999 |
| JP | 2001-084176 | 3/2001 |
| JP | 2002-007215 | 1/2002 |
| JP | 2002-041361 | 2/2002 |
| JP | 2003-152701 | 5/2003 |
| JP | 2003-186753 | 7/2003 |

* cited by examiner

TELEVISION RECEIVER AND ELECTRONIC DEVICE

CLAIM OF PRIORITY

This application claims priority under 35 USC 371 to International Application No. PCT/JP2005/001719, filed on Feb. 4, 2005, which claims priority to Japanese Patent Application No. 2004-029077, filed on Feb. 5, 2004, each of which is incorporated by reference in its entirety.

TECHNICAL FIELD

The present invention relates to a television receiver that promotes copyright protection for a digital video signal obtained after decryption of an encrypted digital video signal, or to an analog video signal.

BACKGROUND ART

A technique of encrypting a video signal for transmission and decrypting the encrypted signal at a receiver end for display is practiced in a viewpoint of preventing copying of the video signal to protect copyright, or keeping fairness in charged broadcasting.

However, if the receiver is modified and the decrypted video signal is taken out to make a copy thereof, the above-mentioned copyright protection and fairness cannot be ensured.

FIG. 10 is a block diagram illustrating two casings containing an encrypted-video description adapter for decrypting an encrypted video signal, and a video display unit, and the internal structures thereof, which is disclosed in Japanese Published Patent Application No. 2003-152701 (Patent Document 1). In FIG. 10, reference numeral 320 denotes an encrypted video decryption adapter, numeral 350 denotes a video display unit, numeral 324 denotes a signal processing circuit, numeral 340 denotes an AC/DC conversion circuit, numeral 337 denotes a wattmeter or an ammeter, numeral 338 denotes a reference value, numeral 339 denotes a comparator, numeral 341 denotes a SW, numeral 328 denotes a decrypted analog video signal, and numeral 355 denotes a power code for supplying a voltage to the video display unit 350. Further, numeral 335 denotes an AC connected included in the encrypted video decryption adapter 320, which is connected to the wattmeter or ammeter 337.

In FIG. 10, the encrypted video decryption adapter 320 and the video display unit 350 are contained in separated casings, and a power to the video display unit 350 is supplied from the AC connector 335 in the encrypted video decryption adapter 320 through the power code 355.

If the decrypted analog video signal 328 is not inputted to the video display unit 350 but is connected to another video recording device, a voltage or a current measured by the wattmeter or ammeter 337 shows a result different from a voltage or a current to be consumed by the video display unit 350.

As the result, an output of the comparator 339 turns off the SW 341, and a DC voltage produced by the AC/DC conversion circuit 340 is not transmitted to the signal processing circuit 324, whereby the decryption operation is halted.

As described above, when the decrypted analog video signal 328 is not inputted to the video display unit 350 but is connected to another device that is not shown in FIG. 10, the decryption is halted, whereby copyright protection can be achieved.

Further, in a digital television receiver, generally, enhancement in performance of a digital decoder unit for decoding digital data is faster relative to a display panel unit for displaying video, resulting in a problem that the digital decoder unit becomes obsolete. Therefore, it is expected that a structure which enables version upgrade of hardware by exchanging only the digital decoder unit is demanded. When the user is allowed to perform version upgrade of hardware, the user opens the cover of the electronic equipment to exchange the electronic device in the casing.

The conventional opening/closing detection of the cover of the electronic equipment is aimed at only preventing falsification of the equipment. For example, as disclosed in Japanese Published Patent Application No. 2002-7215 (Patent Document 2), falsification of the equipment is judged by one-time detection to make the equipment unusable.

DISCLOSURE OF THE INVENTION

Problems to be Solved by the Invention

In the decryption system shown in FIG. 10, since the decryption part and the video display part are contained in separated casings and AC supply voltages are applied to the respective casings, this system cannot be applied to a television receiver in which a decryption unit and a video display unit are stored in a single casing.

Further, when the user opens the cover of the electronic equipment to exchange the electronic device in the casing, a security ensuring mechanism for preventing leakage of data in the digital television receiving apparatus is required. However, as described above, the conventional opening/closing detection of the cover of the electronic equipment is aimed at only preventing falsification of the equipment, and it is decided by just one detection that falsification of the equipment occurs and then the equipment is made unusable. Therefore, the cover opening/closing detection is not applicable to a system in which the user exchanges the device in the casing. Further, when performing the conventional cover opening/closing detection, the equipment must be continuously powered on to detect opening/closing of the cover, and therefore, opening/closing of the cover cannot be detected in an equipment that can be powered off.

The present invention is made to solve the above-described problems and has for its object to provide a television receiver having a decryption unit and a video display unit that are stored in one casing, which television receiver can promote copyright protection for an encrypted digital video signal or analog video signal.

Further, it is another object of the present invention to provide a television receiving apparatus which can detect opening/closing of a cover of an electronic equipment even when the equipment is in its power-off state, and can effectively prevent leakage of data in the digital television receiving apparatus when the user opens the cover of the electronic equipment to exchange a device in the casing.

Measures to Solve the Problems

According to the present invention, there is provided a television receiver for inputting an encrypted digital video signal into a decoding circuit that is provided inside a casing surrounded by a casing cover and a casing body, and visualizing a digital or analog video signal that is decrypted in the decoding circuit, in a video display unit positioned inside the casing, and the television receiver comprises a cover opening/closing detector for detecting opening/closing of the casing cover, and a switch for controlling a power supply voltage that is applied to the decoding circuit, in accordance with an output of the cover opening/closing detector, wherein power is supplied to the decoding circuit through the switch when the output of the cover opening/closing detector indicates that the casing cover is closed, and the supply of power to the decoding circuit is cut off by the switch when the output of the cover opening/closing detector indicates that the casing cover is opened.

According to the present invention, there is provided a television receiver for inputting an encrypted digital video signal into a decoding circuit that is provided inside a casing surrounded by a casing cover and a casing body, and visualizing a digital or analog video signal that is decrypted by the decoding circuit, in a video display unit positioned inside the casing, and the television receiver comprises a cover opening/closing detector for detecting opening/closing of the casing cover, an input means provided outside the casing body, and a decoding control circuit for controlling decoding parameters of the decoding circuit in accordance with the output of the cover opening/closing detector and the input from the input means, wherein the decoding control circuit outputs a parameter for performing the decoding operation to the decoding circuit when the output of the cover opening/closing detector indicates that the casing cover is closed and when there is a predetermined input from the input means, and the decoding control circuit outputs a parameter for stopping the decoding operation to the decoding circuit when there is no predetermined input from the input means and the output of the cover opening/closing detector indicates that the casing cover is opened.

According to the present invention, the cover opening/closing detector comprises a code sequence generation circuit, a light emitter for converting an electric signal from the code sequence generation circuit into light, a light receiver for converting a light signal into an electric signal, a light guide for guiding the light outputted from the light emitter to the light receiver, when the casing cover is closed, a demodulation circuit for demodulating the electric signal from the light receiver, and a comparison circuit for comparing the output of the code sequence generation circuit with the output of the demodulation circuit, and outputting a signal indicating that the casing cover is closed, when these outputs are equal to each other.

According to the present invention, the cover opening/closing detector comprises a condenser means, a charging means for charging the condenser means, a discharging means for discharging the condenser means when the casing cover is opened, and an opening detection means for recognizing that the condenser means is discharged, thereby detecting that the casing cover is opened.

According to the present invention, there is provided an electronic device apparatus having an electronic device that is provided inside a casing surrounded by a casing cover and a casing body, and the apparatus comprises a condenser means, a charging means for charging the condenser means, a discharging means for discharging the condenser means when the casing cover is opened, an opening detection means for recognizing that the condenser means is discharged, thereby detecting that the casing cover is opened, and a number-of-discharging storage means for storing the number of times the condenser means is discharged.

According to the present invention, the electronic device apparatus further includes an operation restriction means for restricting the operation of the electronic device apparatus when the number of discharging that is stored in the number-of-discharging storage means reaches a predetermined number of times.

According to the present invention, the electronic device apparatus includes a display means for performing display using a display unit that is provided inside or outside the casing, and a control means for controlling the display means so that the display means performs display that is different from normal display, when the number of discharging stored in the number-of-discharging storage means reaches a predetermined number of times.

According to the present invention, there is provided an electronic device apparatus including an exchangeable electronic device having its own ID, inside a casing surrounded by a casing cover and a casing body, and the apparatus comprises a condenser means, a charging means for charging the condenser means, a discharging means for discharging the condenser means when the casing cover is opened, an opening detection means for recognizing that the condenser means is discharged, thereby detecting that the casing cover is opened, and an ID comparison means for comparing, when it is recognized that the casing cover is opened and closed, the IDs of the electronic device before and after the opening and closing of the casing cover.

According to the present invention, the electronic device apparatus further includes an operation restriction means for restricting the operation of the electronic device apparatus, when the ID of the electronic device after the opening and closing of the casing cover is identical to or older than the ID of the electronic device before the opening and closing of the casing cover.

According to the present invention, the electronic device further includes a display means for performing display using a display unit that is provided inside or outside the casing, and a control means for controlling the display means so that the display means performs display that is different from normal display, when the ID of the electronic device after the opening and closing of the casing cover is identical to or older than the ID of the electronic device before the opening and closing of the casing cover.

Effects of the Invention

According to the present invention, there is provided a television receiver for inputting an encrypted digital video signal into a decoding circuit that is provided inside a casing surrounded by a casing cover and a casing body, and visualizing a digital or analog video signal that is decrypted in the decoding circuit, in a video display unit positioned inside the casing, and the television receiver comprises a cover opening/closing detector for detecting opening/closing of the casing cover, and a switch for controlling a power supply voltage that is applied to the decoding circuit, in accordance with an output of the cover opening/closing detector, wherein power is supplied to the decoding circuit through the switch when the output of the cover opening/closing detector indicates that the casing cover is closed, and the supply of power to the decoding circuit is cut off by the switch when the output of the cover opening/closing detector indicates that the casing cover is opened. Therefore, even when someone opens the casing cover and tries to take out the video signal decrypted by the decoding circuit, since the output of the decoding circuit is in its halting state when the casing cover is opened, illegal copying can be prevented from occurring.

Further, according to the present invention, there is provided a television receiver for inputting an encrypted digital video signal into a decoding circuit that is provided inside a casing surrounded by a casing cover and a casing body, and visualizing a digital or analog video signal that is decrypted by the decoding circuit, in a video display unit positioned inside the casing, and the television receiver comprises a cover opening/closing detector for detecting opening/closing of the casing cover, an input means provided outside the casing body, and a decoding control circuit for controlling decoding parameters of the decoding circuit in accordance with the output of the cover opening/closing detector and the input from the input means, wherein the decoding control circuit outputs a parameter for performing the decoding operation to the decoding circuit when the output of the cover opening/closing detector indicates that the casing cover is closed and when there is a predetermined input from the input means, and the decoding control circuit outputs a parameter for stopping the decoding operation to the decoding circuit when there is no predetermined input from the input means and the output of the cover opening/closing detector indicates that the casing cover is opened. Therefore, the output of the decoding circuit is halted when the casing cover is opened, whereby illegal copying can be prevented from occurring. Further, when a maintainer of the television receiver inputs, through the input means, a command for compulsorily outputting decoding parameters to the decoding control circuit, the decoding circuit can be operated even in the state where the casing cover is open, thereby keeping the maintainability.

According to the present invention, the cover opening/closing detector comprises a code sequence generation circuit, a light emitter for converting an electric signal from the code sequence generation circuit into light, a light receiver for converting a light signal into an electric signal, a light guide for guiding the light outputted from the light emitter to the light receiver, when the casing cover is closed, a demodulation circuit for demodulating the electric signal from the light receiver, and a comparison circuit for comparing the output of the code sequence generation circuit with the output of the demodulation circuit, and outputting a signal indicating that the casing cover is closed, when these outputs are equal to each other. Therefore, the output of the decoding circuit is halted when the casing cover is opened, whereby illegal copying can be prevented from occurring. Further, since, in order to make a state where the casing cover is virtually closed although it is actually open, it is necessary to generate a code sequence identical to the code sequence generated by the code sequence generation circuit outside the television receiver and input it to the light receiver, it is not easy to make the state where the casing cover is virtually closed, whereby illegal use of the device can be suppressed.

According to the present invention, the cover opening/closing detector comprises a condenser means, a charging means for charging the condenser means, a discharging means for discharging the condenser means when the casing cover is opened, and an opening detection means for recognizing that the condenser means is discharged, thereby detecting that the casing cover is opened. Therefore, the output of the decoding circuit is halted when the casing cover is opened, whereby illegal copying can be prevented from occurring, and furthermore, it is possible to detect that the casing cover is opened when the device is in its power-off state, thereby suppressing illegal use of the device.

According to the present invention, there is provided an electronic device apparatus having an electronic device that is provided inside a casing surrounded by a casing cover and a casing body, and the apparatus comprises a condenser means, a charging means for charging the condenser means, a discharging means for discharging the condenser means when the casing cover is opened, an opening detection means for recognizing that the condenser means is discharged, thereby detecting that the casing cover is opened, and a number-of-discharging storage means for storing the number of times the condenser means is discharged. Therefore, it is possible to detect not only that the casing cover is opened when the device is in its power-on state but also that the casing cover is opened when the device is in its power-off state, whereby illegal use of the device can be suppressed.

According to the present invention, the electronic device apparatus further includes an operation restriction means for restricting the operation of the electronic device apparatus when the number of discharging that is stored in the number-of-discharging storage means reaches a predetermined number of times. Therefore, it is possible to detect not only that the casing cover is opened when the device is in its power-on state but also that the casing cover is opened when the device is in its power-off state, whereby illegal use of the device can be suppressed.

According to the present invention, the electronic device apparatus further includes a display means for performing display using a display unit that is provided inside or outside the casing, and a control means for controlling the display means so that the display means performs display that is different from normal display, when the number of discharging stored in the number-of-discharging storage means reaches a predetermined number of times. Therefore, it is possible to detect not only that the casing cover is opened when the device is in its power-on state but also that the casing cover is opened when the device is in its power-off state, whereby illegal use of the device can be suppressed.

According to the present invention, there is provided an electronic device apparatus including an exchangeable electronic device having its own ID, inside a casing surrounded by a casing cover and a casing body, and the apparatus comprises a condenser means, a charging means for charging the condenser means, a discharging means for discharging the condenser means when the casing cover is opened, an opening detection means for recognizing that the condenser means is discharged, thereby detecting that the casing cover is opened, and an ID comparison means for comparing, when it is recognized that the casing cover is opened and closed, the IDs of the electronic device before and after the opening and closing of the casing cover. Therefore, it is possible to detect illegal opening/closing of the casing cover while allowing the user to open the cover of the electronic equipment and exchange the device in the equipment, whereby illegal use of the equipment can be suppressed.

According to the present invention, the electronic device apparatus further includes an operation restriction means for restricting the operation of the electronic device apparatus, when the ID of the electronic device after the opening and closing of the casing cover is identical to or older than the ID of the electronic device before the opening and closing of the casing cover. Therefore, it is possible to detect illegal opening/closing of the casing cover while allowing the user to open the cover of the electronic equipment and exchange the device in the equipment, whereby illegal use of the equipment can be suppressed.

According to the present invention, the electronic device further includes a display means for performing display using a display unit that is provided inside or outside the casing, and a control means for controlling the display means so that the display means performs display that is different from normal display, when the ID of the electronic device after the opening and closing of the casing cover is identical to or older than the ID of the electronic device before the opening and closing of the casing cover. Therefore, it is possible to detect illegal opening/closing of the casing cover while allowing the user to open the cover of the electronic equipment and exchange the device in the equipment, whereby illegal use of the equipment can be suppressed.

DESCRIPTION OF THE REFERENCE NUMERALS

Figure 1:
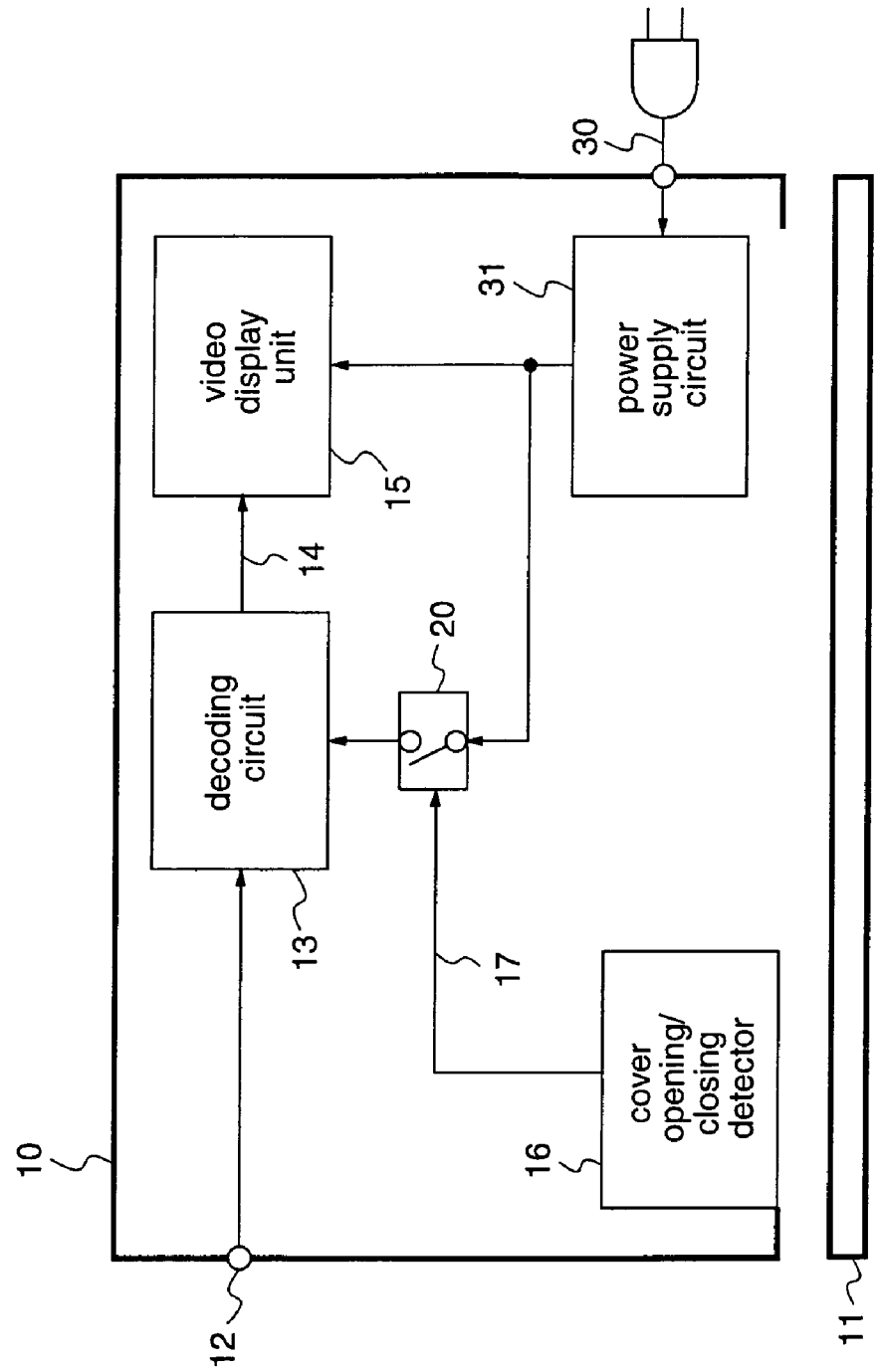
FIG. 1 is a block diagram illustrating the construction of a television receiver according to a first embodiment of the present invention.

10 . . . casing body of the television receiver of the present invention
11 . . . casing cover of the television receiver of the present invention
12 . . . encrypted digital video signal input terminal
13 . . . decoding circuit
14 . . . decrypted digital video or analog video signal
15 . . . video display unit
16 . . . cover opening/closing detector
17 . . . cover opening/closing detection signal
18 . . . button group
20 . . . power-on control switch
30 . . . AC code
31 . . . power supply circuit
40 . . . decoding control circuit
100 . . . case of mechanical switch
101 . . . upper contact point
102 . . . lower contact point
103 . . . spring comprising non-conductive material
104 . . . projection provided on the casing cover 11
201 . . . light guide
202 . . . light emitter
203 . . . light receiver
204 . . . substrate
205 . . . code sequence generation circuit
206 . . . demodulation circuit
207 . . . comparison circuit
601 . . . digital television receiving apparatus
602 . . . front end
603 . . . digital decoder module
604 . . . digital decoder
605 . . . IC card I/F
606 . . . memory
607 . . . IC card
608 . . . CPU
609 . . . cover opening/closing detector
610 . . . memory
611 . . . display panel
612 . . . speaker
613 . . . network interface
614 . . . terrestrial antenna
615 . . . BS digital antenna
616 . . . external network
700 . . . casing body
701 . . . casing cover
702 . . . cover opening/closing detection switch
703 . . . charging means
704 . . . condenser

BEST MODE TO EXECUTE THE INVENTION

Hereinafter, embodiments of the present invention will be described with reference to the drawings.

EMBODIMENT 1

FIG. 1 is a block diagram illustrating the construction of a television receiver according to a first embodiment of the present invention. With reference to FIG. 1, reference numeral 10 denotes a casing body of the television receiver, numeral 11 denotes a casing cover of the television receiver. Reference numeral 12 denotes a terminal to which an encrypted digital video signal is inputted. The terminal 12 is provided on the casing body 10, and transfers the video signal from the outside of the casing through a connector to the inside of the casing. Reference numeral 13 denotes a decoding circuit for decrypting the digital video signal that is inputted from the encrypted digital video signal input terminal 12. Reference numeral 14 denotes an after-decryption video signal that is a decrypted digital video or analog video outputted from the decoding circuit 13, and numeral 15 denotes a video display unit for visualizing the decrypted digital video signal or analog video signal 14. Further, reference numeral 16 denotes a cover opening/closing detector for detecting opening/closing of the casing cover 11, numeral 17 denotes an output signal from the cover opening/closing detector, and numeral 20 denotes a switch for controlling power activation of the decoding circuit 13. Reference numeral 31 denotes a power supply circuit for supplying a power to the decoding circuit 13 and the video display unit 15 through the switch 20, and numeral 30 denotes an AC code for supplying a commercial power to the power supply circuit 31.

The digital video signal input terminal 12 abuts on the casing body 10, and the decoding circuit 13, the after-decryption video signal 14, the video display unit 15, the cover opening/closing detector 16, the cover opening/closing detection signal 17, the switch 20, and the power supply circuit 31 are disposed inside the casing, which is surrounded by the casing body 10 and the casing cover 11.

Figure 3:
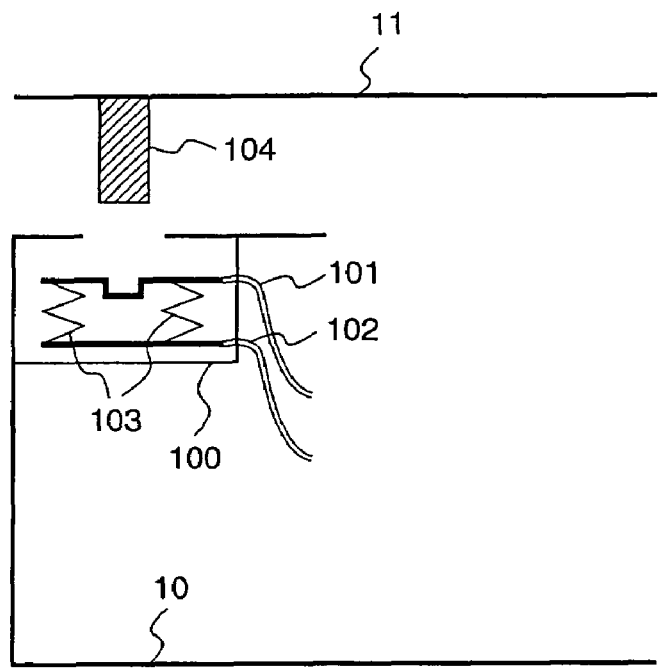
FIG. 3 is a cross-sectional view of a mechanical switch for detecting opening/closing of a casing cover of a television receiver according to the present invention.

FIG. 3 is a cross-sectional view of a mechanical switch of the cover opening/closing detector 16 of the television receiver according to the first embodiment of the present invention. In FIG. 3, reference numeral 104 denotes a projection provided on the casing cover 11. Reference numeral 100 denotes a case of the mechanical switch, which is fixed to the casing body 10. Reference numeral 101 denotes an upper contact point comprising a conductive material, which is vertically movable in the case 100. Reference numeral 102 denotes a lower contact point comprising a conductive material, which is fixed to the bottom of the case 100. Reference numeral 103 denotes a spring comprising a non-conductive material, which is positioned between the upper contact point 101 and the lower contact point 102. The upper contact point 101, the lower contact point 102, and the spring 103 are enclosed in the case 100, and the case 100 has a window through which the upper contact point 101 is pressed by the projection 104 of the casing cover 11. The projection 104 has a length in the vertical direction, which length makes the upper contact point 101 contact the lower contact point 102 when the upper contact point 101 is pressed downward by the projection 104, in the state where the casing cover 11 fits the casing body 10 to close the casing body 10.

In FIG. 3, in the state where the casing cover 11 is closed and fitted to the casing body 10, the upper contact point 101 contacts the lower contact point 102, and thereby the switch is in its turn-on state. On the other hand, in the state where the casing cover 11 is open, the contact between the upper contact point 101 and the lower contact point 102 is released by the spring 103, and thereby the switch is in its turn-off state.

When a digital video signal that is subjected to encryption such as copy protection is inputted through the digital video signal input terminal 12 to the television receiver shown in FIG. 1, the input signal is decrypted by the decoding circuit 13 to provide an after-decryption video signal 14 that is copiable, and thereafter, the after-decryption video signal 14 is visualized by the video display unit 15.

When the casing cover 11 is closed, the cover opening/closing detector 16 outputs a cover opening/closing detection signal 17 indicating that the casing cover 11 is closed. When the cover opening/closing detection signal 17 indicates that the casing cover 11 is closed, the switch 20 passes a current from the power supply circuit 31 to the decoding circuit 13. As a result, when the casing cover 11 is closed, a decrypted video is displayed on the video display unit 15.

On the other hand, when the casing cover 11 is open, the cover opening/closing detector 16 outputs a cover opening/closing detection signal 17 indicating that the casing cover 11 is open, and the switch 20 cuts off the current from the power supply circuit 31 to cut off the supply of power to the decoding circuit 13, whereby the operation of the decoding circuit 13 is stopped.

While in the above-mentioned construction only one cover opening/closing detector 16 using the mechanical switch is provided, two or more mechanical switches may be disposed in the casing body 10. In this case, it is determined that the casing cover is closed when all the plural cover opening/closing detection signals 17 indicate that the casing cover is closed, thereby to operate the decoding circuit 13.

According to the above-mentioned construction and operation, when the user opens the casing cover 11 to connect the after-decryption video signal 14 to a device other than that shown in FIG. 1, the operation of the decoding circuit 13 is stopped, thereby providing copyright protection for the encrypted digital video.

As described above, according to the first embodiment, the television receiver is provided with the cover opening/closing detector 16 for detecting the opening/closing state of the casing cover 11, and the switch 20 for controlling the power supply voltage applied to the decoding circuit 13 in accordance with the output of the cover opening/closing detector 16, and a power supply voltage is applied to the decoding circuit 13 via the switch 20 when the output of the cover opening/closing detector 16 indicates that the casing cover 11 is closed, while the supply of power to the decoding circuit is cut off by the switch 20 when the output of the cover opening/closing detector 16 indicates that the casing cover 11 is open. Therefore, even when someone opens the casing cover 11 and tries to take out the video signal that is decrypted by the decoding circuit 13, since the output of the decoding circuit 13 is in its halt state when the casing cover 11 is opened, illegal copying can be prevented from occurring.

EMBODIMENT 2

In the television receiver according to the first embodiment, since the decoding operation is stopped even when the casing cover is opened to perform maintenance of the inside of the television, maintainability is degraded. A television receiver according to the second embodiment of the present invention enables the decoding operation during maintenance.

Figure 2:
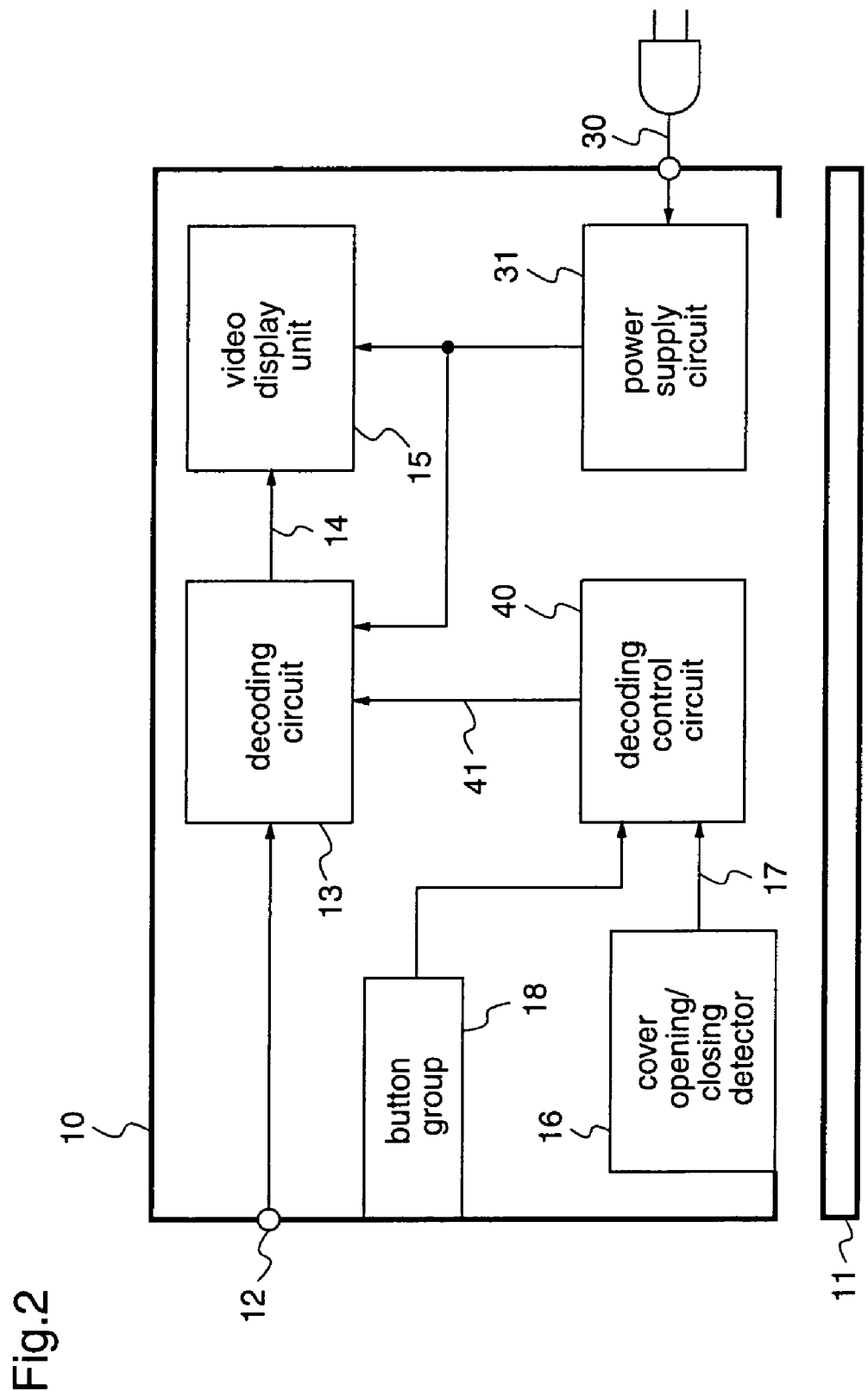
FIG. 2 is a block diagram illustrating the construction of a television receiver according to a second embodiment of the present invention.

FIG. 2 is a block diagram illustrating the construction of the television receiver according to the second embodiment. In FIG. 2, the same reference numerals as those shown in FIG. 1 denote the same or corresponding parts, and therefore, repeated description is not necessary.

In FIG. 2, reference numeral 18 denotes at least one button that is exposed to the outside of the casing body 10, and numeral 40 denotes a decoding control circuit which receives a cover opening/closing detection signal 17 and a button hold-down signal from the button group 18, and outputs a parameter 41 for decryption to the decoding circuit 13.

Hereinafter, the operation of the second embodiment of the present invention will be described with reference to FIG. 2.

When a digital video signal that is subjected to encryption such as copy protection is inputted to the digital video signal input terminal 12, the digital video signal is decrypted by the decoding circuit 13 to obtain an after-decryption video signal 14 that copiable, and thereafter, the after-decryption video signal 14 is visualized by the video display unit 15.

When the casing cover 11 is opened and the cover opening/closing detection signal 17 indicates that the cover is open, the decoding control circuit 40 converts the parameter 41 that is needed for decryption, such as an encryption key, into a meaningless parameter 41, and outputs it to the decoding circuit 13. As a result, the after-decryption video signal 14 as an output from the decoding circuit 13 becomes a video signal that is not decrypted.

On the other hand, during maintenance, a service man inputs a predetermined code from the button group 18. This code is inputted to the decoding control circuit 40. Only when the inputted code matches an initially set code, the decoding circuit 40 outputs the normal decryption parameter 41 to the decoding circuit 13 even if the cover opening/closing detection signal 17 indicates that the cover is open. As a result, even when the casing cover 11 is open, decryption is continued, and the maintenance work can be carried out.

As described above, according to the second embodiment, the television receiver is provided the cover opening/closing detector 16 for detecting the opening/closing state of the casing cover 11, the button group 18 provided outside the casing body 10, and the decoding control circuit 40 for controlling the decoding parameter of the decoding circuit 13 in accordance with the output 17 from the cover opening/closing detector 16 and the input to the button group 18. When the output 17 of the cover opening/closing detector 16 indicates that the casing cover 11 is closed, and when the predetermined code is inputted from the button group 18, the decoding control circuit 40 outputs the parameter 41 for performing the decoding operation to the decoding circuit 13. When the predetermined code is not inputted from the button group 18 and the output 17 of the cover opening/closing detector 16 indicates that the casing cover 11 is open, the decoding control circuit 40 outputs the parameter 41 for stopping the decoding operation to the decoding circuit 13. Therefore, the output of the decoding circuit is stopped when the casing cover is opened, thereby preventing illegal copying from occurring, and simultaneously, when a maintainer of the television receiver inputs a code of a command that compulsorily makes the decoding control circuit output the decoding parameter, the operation of the decoding circuit can be carried out even when the casing cover is open, whereby maintainability can be ensured.

While in this second embodiment the predetermined code is inputted from the button group 18 that is provided outside the casing body 10, the means for inputting the predetermined code to the decoding control circuit 40 is not restricted to the button group, and the predetermined code may be input to the decoding control circuit 40 by another input means, such as inputting the predetermined code to the decoding control circuit 40 using a technique of infrared communication or the like.

EMBODIMENT 3

In the constructions of the cover opening/closing detectors according to the first and second embodiments of the present invention, it is easily found that the switch is present on the casing body, and further, it is possible to make a state as if the casing cover is closed even when the casing cover is open, by inserting a bar-shaped substance that is similar in shape to the projection provided on the casing cover, into the switch of the casing body.

In a television receiver according to a third embodiment of the present invention, in view of the above-mentioned problem, the cover opening/closing detector uses a modulated light, and the constituents of the television receiver other than the cover opening/closing detector are identical to those of the first or second embodiment.

Figure 4:
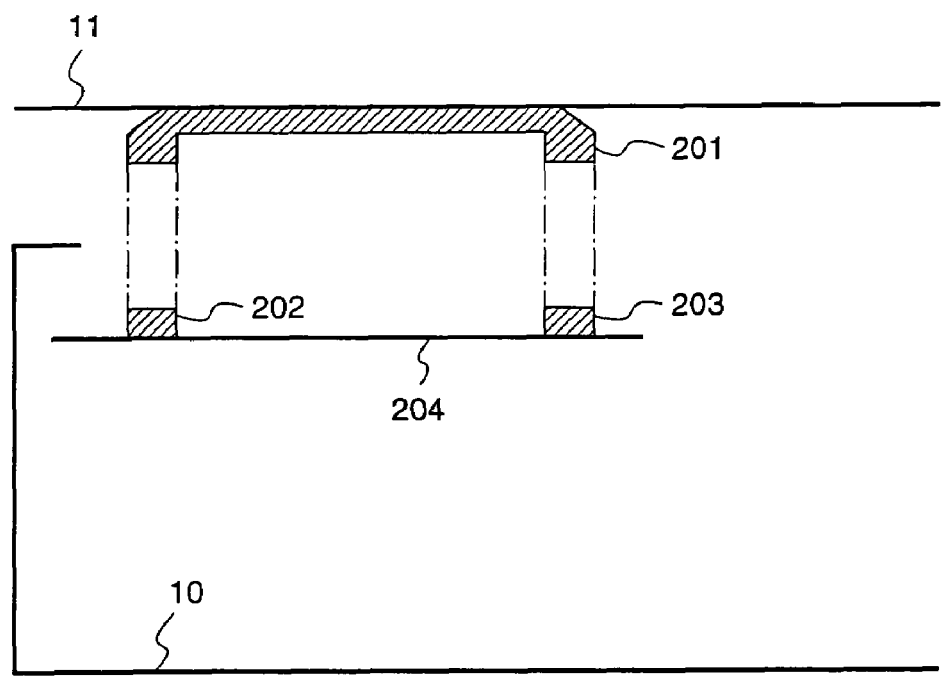
FIG. 4 is a cross-sectional view illustrating the construction of a cover opening/closing detection means using light, which is included in a television receiver according to a third embodiment of the present invention.
Figure 5:
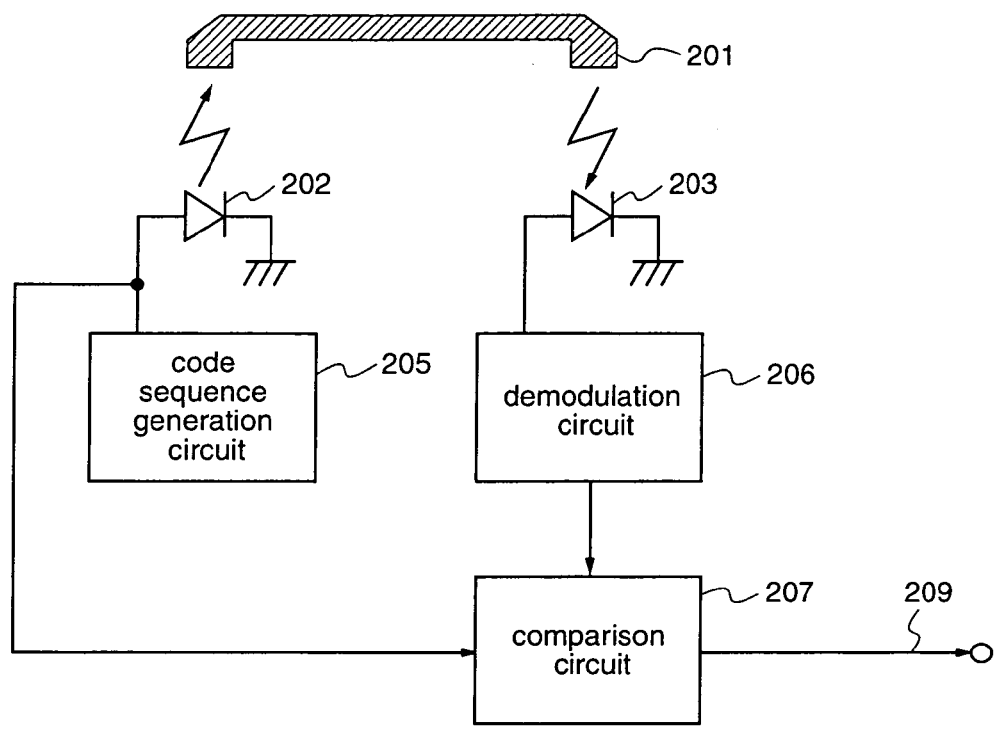
FIG. 5 is a diagram for explaining the operation of the cover opening/closing detection means using light which is included in the television receiver according to the third embodiment.

FIG. 4 is a cross-sectional view illustrating the construction of the cover opening/closing detector of the television receiver according to the third embodiment, and FIG. 5 is a block diagram for explaining the operation of the television receiver according to the third embodiment.

With reference to FIG. 4, reference numeral 10 denotes a casing body of the television receiver, and numeral 11 denotes a casing cover of the television receiver. Reference numeral 201 denotes a light guide disposed on the inner side of the casing cover 11, and the light guide 201 may comprise any material such as a resin or a glass so long as it transmits light to the inside. Further, reference numeral 202 denotes a light emitter which is an element for converting an electric signal into a light signal, such as an LED, an electric bulb, or a laser diode. Reference numeral 203 denotes a light receiver for converting a light signal into an electric signal, which is represented by a photodiode. Reference numeral 204 denotes a substrate on which the light emitter 202 and the light receiver 203 are mounted, and the substrate 204 is located inside the casing body 10. Further, the light emitter 202 and the light receiver 203 have a light receiving surface and a light receiving surface facing the casing cover 11, and are disposed on the same axes as the two facets of the light guide 201, respectively.

With reference to FIG. 5, reference numeral 205 denotes a circuit for generating a predetermined code sequence that is constituted by codes of "1" or "0", and the circuit outputs the generated code sequence to the light emitter 202 and a comparison circuit 207 described later. Reference numeral 206 denotes a demodulation circuit for demodulating a code sequence from an electric signal from the light receiver 203. Reference numeral 207 denotes a comparison circuit for comparing the code sequence generated by the code sequence generation circuit 205 with the code sequence demodulated by the demodulation circuit 206, and the comparison circuit 207 outputs a signal indicating that the casing cover is closed when the two code sequences inputted to the comparison circuit match, and outputs a signal indicating that the casing cover is open when the two code sequences does not match.

Hereinafter, the operation of the cover opening/closing detector of the television receiver according to the third embodiment will be described with reference to FIGS. 5 and 6.

Initially, a continuous code sequence is generated by the code sequence generation circuit 205, and the light emitter 202 is operated. When the casing cover 11 is closed, a light signal emitted from the light emitter 202 reaches the light receiver 203 via the light guide 201. The light receiver 203 converts the arrived light signal into an electric signal, and inputs the electric signal to the demodulation circuit 206. The demodulation circuit 206 removes a noise that is superposed on the electric signal from the light receiver 203, and outputs the electric signal to the comparison circuit 207. The comparison circuit 207 compares the code sequence generated by the code generation circuit 205 with the code sequence that is obtained after the light signal is converted into the electric signal by the demodulation circuit 206, and outputs a cover opening/closing detection signal 209 indicating that the casing cover is closed, only when these code sequences match.

On the other hand, when the casing cover 11 is open, the light signal emitted from the light emitter 202 does not reach the light receiver 203, and therefore, the code sequence outputted from the demodulation circuit 206 does not match the code sequence outputted from the code sequence generation circuit 205. As a result, the cover opening/closing detection signal outputted from the comparison circuit 207 indicates that the casing cover is open.

As described above, according to the third embodiment, in the television receiver according to the first or second embodiment, the cover opening/closing detector 16 is provided with the code sequence generation circuit 205, the light emitter 202 for converting an electric signal from the code sequence generation circuit 205 into light, the light receiver 203 for converting a light signal into an electric signal, the light guide 201 for guiding the light outputted from the light emitter 202 to the light receiver 203 when the casing cover 11 is closed, the demodulation circuit 206 for demodulating the electric signal from the light receiver 203, and the comparison circuit 207 for comparing the output from the code sequence generation circuit 205 with the output from the demodulation circuit 206, and outputting a signal indicating that the casing cover 11 is closed, only when these outputs match. Therefore, the output of the decoding circuit is stopped when the casing cover is opened, thereby preventing illegal copying from occurring. Further, in order to make a state as if the casing cover is virtually closed although the casing cover is actually open, it is necessary to generate a code sequence identical to the code sequence that is generated by the code sequence generation circuit, outside the television receiver, and input the code sequence to the light receiver. Accordingly, the state where the casing cover is virtually closed cannot be made easily, and therefore, illegal use of the equipment can be suppressed.

While in the third embodiment the light emitter 202, the light guide 201, and the light receiver 203 are adopted and the light guide 201 optically connects the light emitter 202 to the light receiver 203 when the casing cover is closed. However, the light emitter 202, the light guide 201, and the light receiver 203 may be a conductive output terminal that outputs an electric signal, a conductive member that passes the electric signal, and a conductive input terminal that receives the electric signal, respectively, and the conductive member may electrically connected the conductive output terminal and the conductive input terminal when the casing cover is closed.

EMBODIMENT 4

Hereinafter, a fourth embodiment of the present invention will be described with reference to the drawings.

Figure 6:
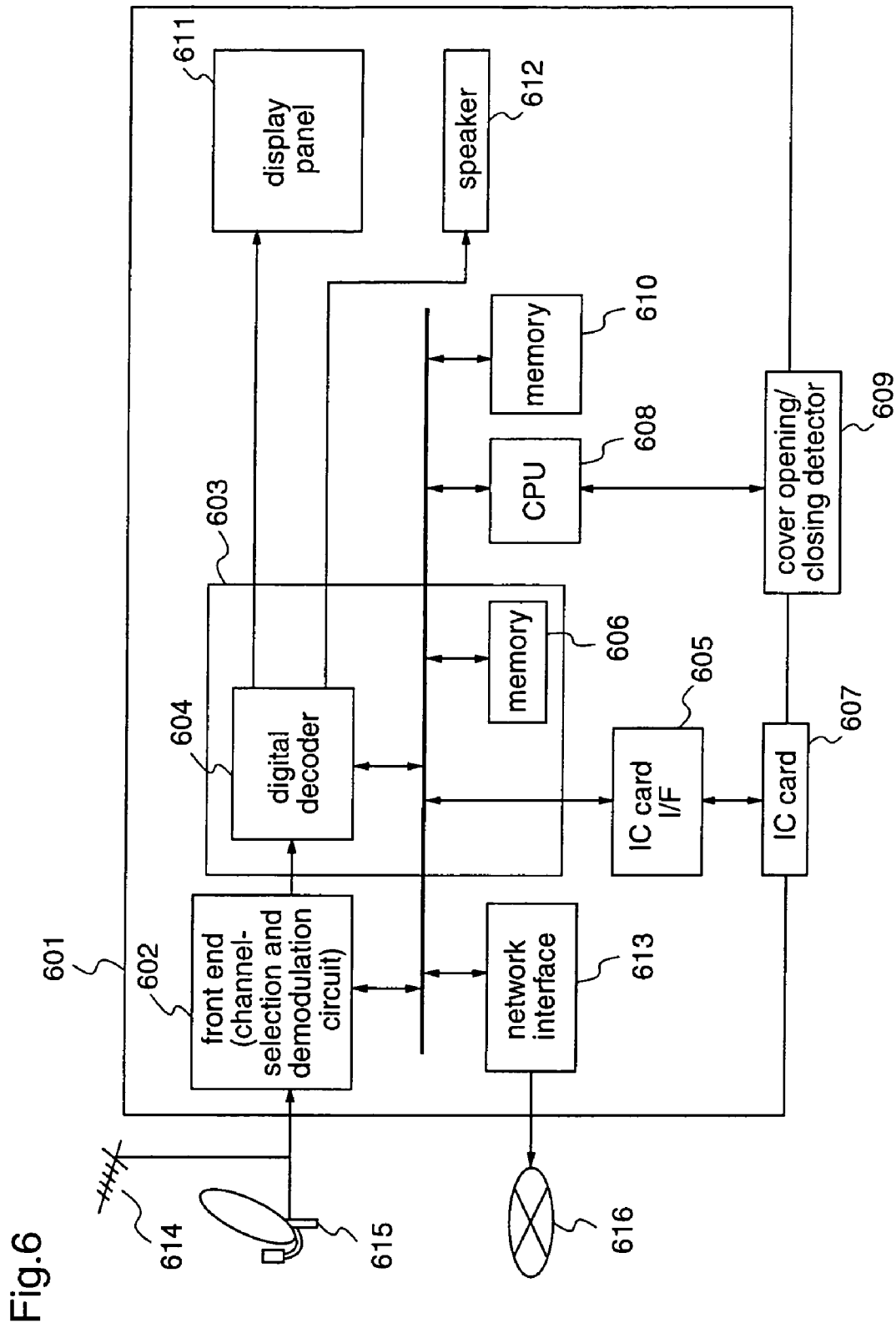
FIG. 6 is a block diagram illustrating the construction of a television receiving apparatus according to a fourth embodiment of the present invention.

FIG. 6 is a diagram illustrating the construction of a digital television receiving apparatus according to the fourth embodiment of the present invention. With reference to FIG. 6, the digital television receiving apparatus 601 can receive BS digital broadcasting and terrestrial digital broadcasting, and a terrestrial antenna 614 and a BS digital antenna 615, which are placed outside, are connected to the digital television receiving apparatus 601. A signal from the antenna is subjected to channel selection and digital demodulation by a front end 602, and video data, audio data, and other data are demodulated by a digital decoder module 603 containing a digital decoder 604 and a memory 606. The video signal is displayed by a display panel 611 while the audio signal is reproduced by a speaker 612. Further, the digital decoder module is connected to an IC card 607 via an IC card I/F 605, and performs data communication for canceling restricted reception. For example, when the user has viewed a pay-per-view program, charging information thereof is transmitted to a management company (server) via a network interface 613 and an external network. The digital television receiving apparatus 601 is provided with a cover for exchange of the digital decoder module, and opening/closing of the cover is detected by a cover opening/closing detector 609, and then the detected result is informed to a CPU 608, whereby the number of times of opening/closing can be stored in a memory 610.

Figure 7A:
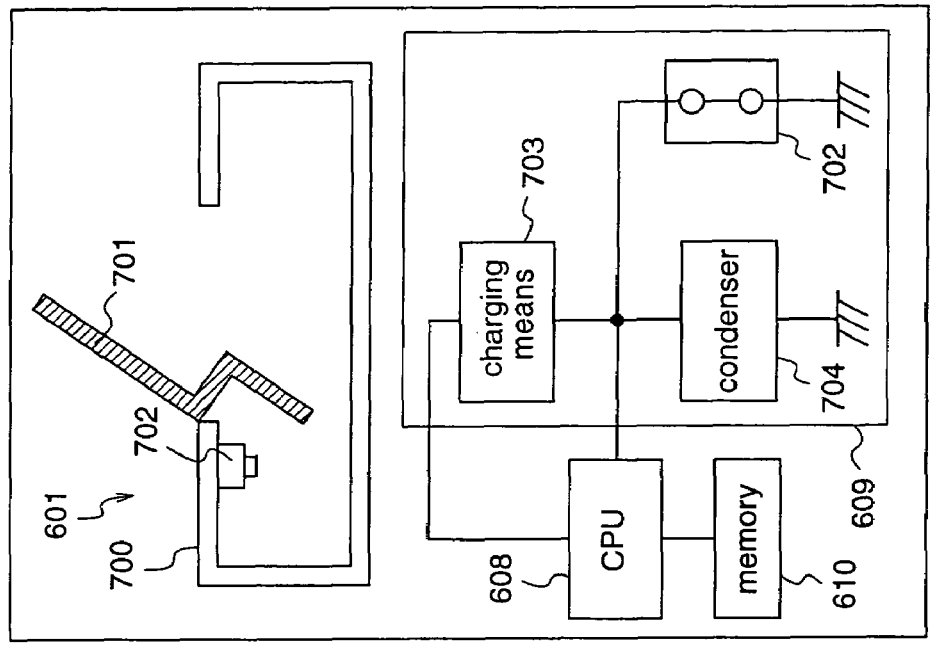
FIG. 7 is a diagram for explaining the construction and operation of a cover opening/closing detection part of the television receiving apparatus according to the fourth embodiment.
Figure 7B:
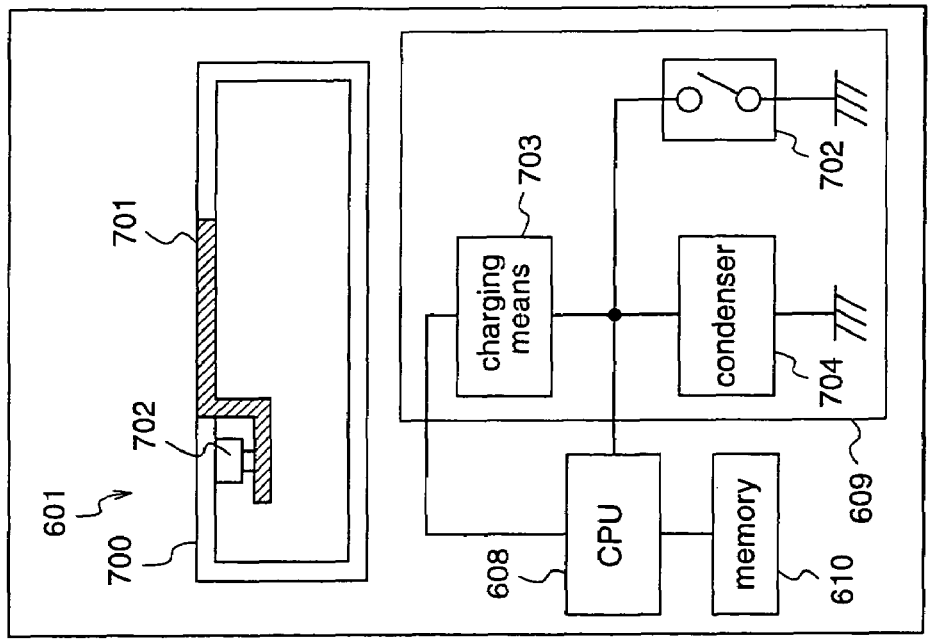

FIG. 7 is a diagram illustrating the specific construction of the cover opening/closing detector 609 shown in FIG. 6. With reference to FIG. 7, the same reference numerals as those shown in FIG. 6 denote the same or corresponding parts. Reference numeral 700 denotes a casing body, numeral 701 denotes a casing cover, numeral 702 denotes a cover opening/closing detection switch, numeral 703 denotes a charging means, and numeral 704 denotes a condenser. FIG. 7(a) shows the state where the casing cover 701 for exchange of a digital decoder module is closed, while FIG. 7(b) shows the state where the casing cover 701 is open. The casing cover 701 can be opened and closed by the user, and the cover opening/closing detection switch 702 that is a mechanical switch for detecting opening/closing of the casing cover 701 is disposed in a place where the user cannot touch it. The cover opening/closing detector 609 is provided with the condenser 704 and the charging means 703 for charging the condenser 704, and the CPU 608 can detect the voltage charged in the condenser 704 and store the number of times the voltage is detected, into the memory 610. Further, the condenser 704 can hold the voltage even when the power supply to the digital television receiving apparatus 601 is cut off. The cover opening/closing detection switch 702 may have any shape so long as it is a mechanical switch for connecting/shutting the circuit in accordance with the mechanical motion when the casing cover is opened or closed. The cover opening/closing detection switch may be placed in any position in the apparatus so long as the user cannot touch the switch. The shape of the casing cover is not restricted to a door type as shown in FIG. 7. The casing cover may have any shape so long as it can actuate the above-mentioned mechanical switch by the mechanical motion of the casing cover when it is opened and closed, for example, the entire back cover of the apparatus may be the casing cover.

Next, the operation of the television receiving apparatus according to the fourth embodiment will be described.

Since the cover opening/closing detection switch 702 is in its open state when the casing cover 701 is closed, the condenser 704 is charged, and the CPU 608 can detect that the cover 701 is closed. When the casing cover 701 is opened, the cover opening/closing detection switch 702 is connected to the earth, and the charge stored in the condenser is immediately discharged, whereby the CPU 608 can detect that the cover is opened. Since the CPU 608 continuously observes the voltage of the condenser 704 when the digital television receiving apparatus 601 is in its power-on state, the CPU 608 can detect opening/closing of the casing cover 701 in real time.

Figure 9:
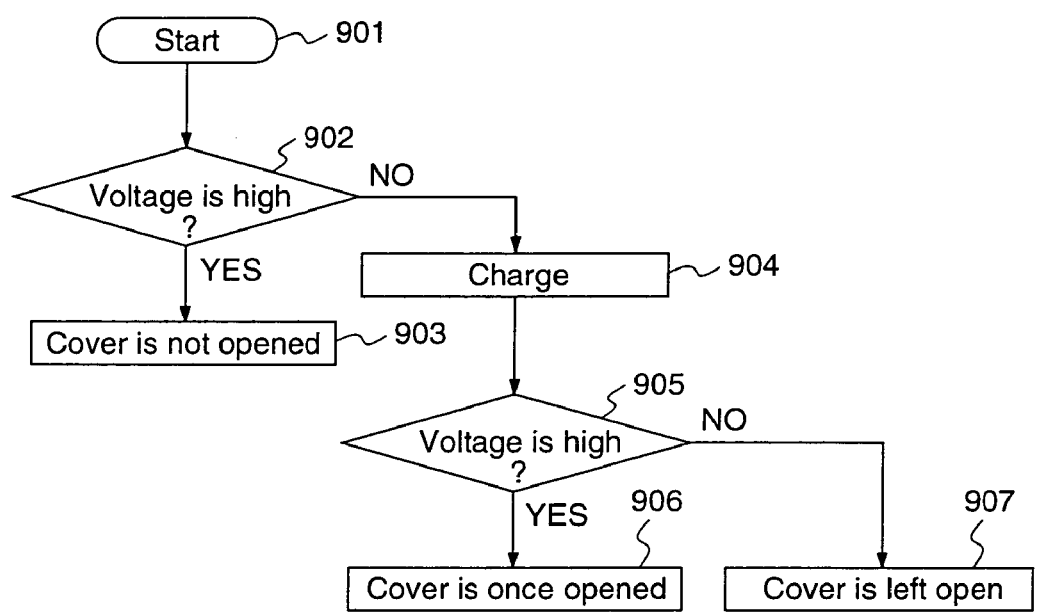
FIG. 9 is a flowchart for explaining the operation of detecting opening/closing history in the television receiving apparatus according to the fourth embodiment.
Figure 10:
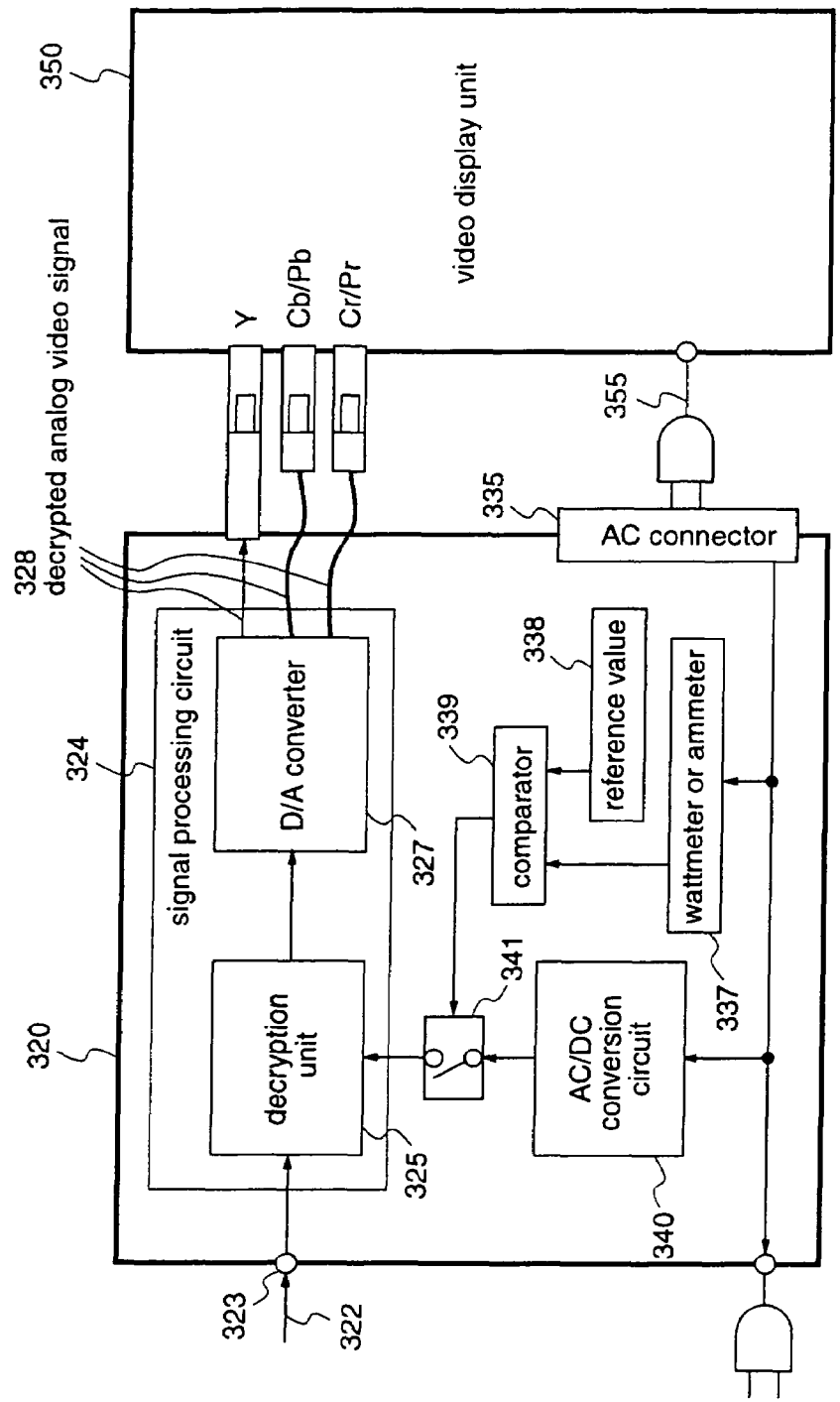
FIG. 10 is a block diagram for explaining the conventional copying prevention apparatus.

On the other hand, the CPU 608 is programmed to check the voltage of the condenser 704 when the digital television receiving apparatus 601 is powered on from its power-off state. If the casing cover is opened and closed when the digital television receiving apparatus 601 is in the power-off state, the condenser 704 has no charge, and the CPU 608 senses this to detect that the cover is opened and closed during the power-off state. FIG. 9 is a flowchart illustrating the operation when the digital television receiving apparatus 601 in the power-off state is powered on. When the digital television receiving apparatus 601 is powered on from its power-off state (step 901), the CPU 608 initially checks the voltage of the condenser 704 (step 902), and determines that the casing cover 701 is not opened when the voltage is high (step 903) to terminate the operation. On the other hand, when the voltage of the condenser 704 is low in step 902, the CPU 608 charges the condenser 704 using the charging means 703 (step 904), and thereafter, checks the voltage of the condenser 704 again (step 905), and determines that the casing cover 701 is closed after it was once opened (step 906) to terminate the operation. On the other hand, when the voltage of the condenser 704 is low in step 905, the CPU 608 determines that the casing cover 701 is kept open (step 907) to terminate the operation.

Figure 8:
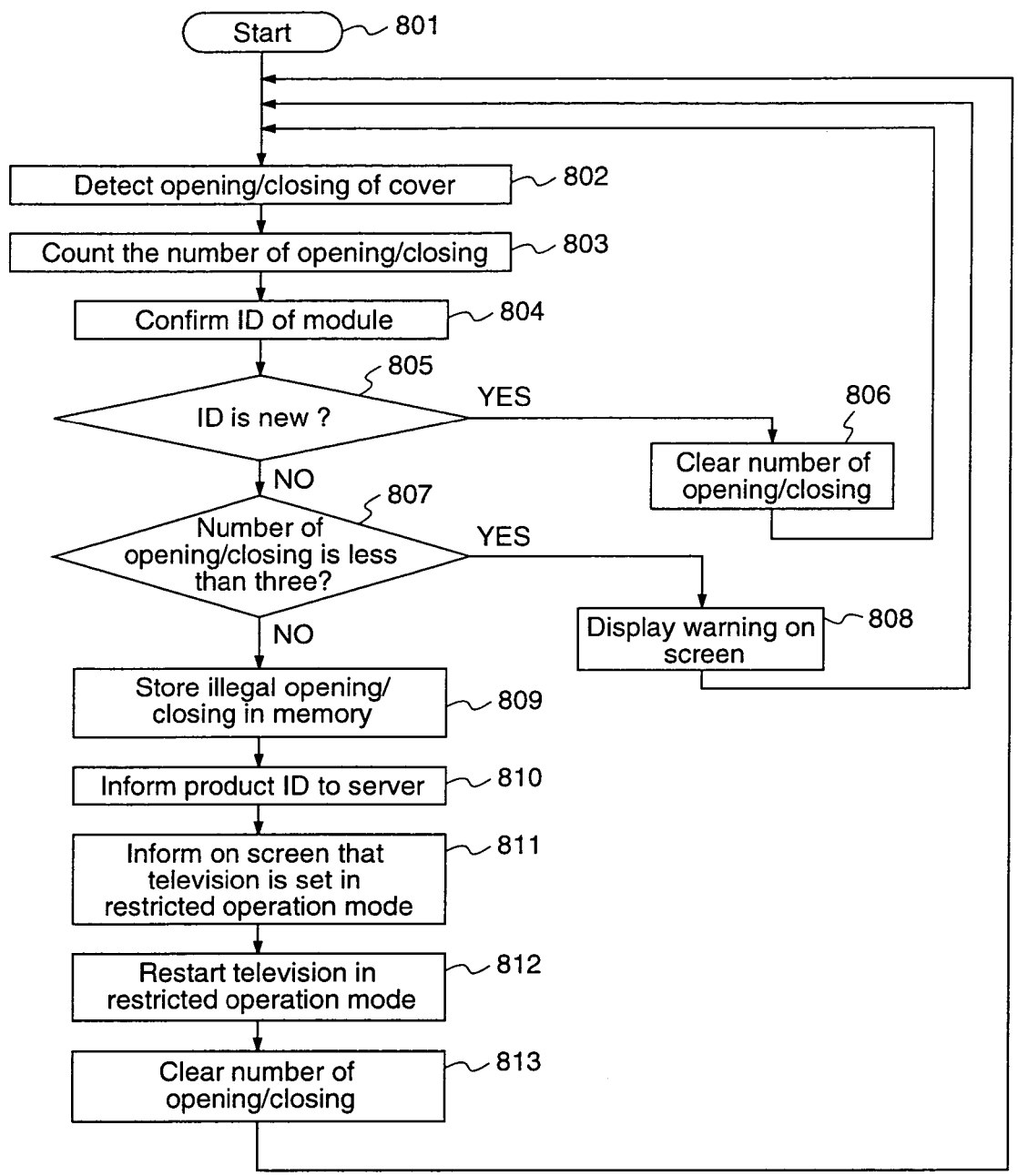
FIG. 8 is a flowchart for explaining the operation of the television receiving apparatus according to the fourth embodiment.

FIG. 8 shows algorithms of cover opening/closing detection, storage of number of opening/closing, and data protection at illegal opening/closing. When the CPU 608 detects opening/closing of the cover 701 (step 802), the CPU 608 counts the number of closing/opening, and stores it in the memory 610 (step 803). Then, the CPU 608 reads the ID of the digital decoder module 603 from the memory 606 in the digital decoder module 603 (step 804), and compares it with the ID before opening/closing (step 805). When the ID is new ("Y" in step 805), the CPU 608 determines that the digital decoder module is regularly exchanged by the user, and clears the number of opening/closing of the cover (step 806) to return to the state of cover opening/closing detection. When, in step 805, the ID is the same or old, or the ID cannot be read, the CPU 608 determines that the cover is irregularly opened/closed ("N" in step 805), and checks the accumulated number of opening/closing (step 807). When the number of opening/closing is three or less ("Y" in step 807), the CPU 608 displays, on a screen, warning that the user should not perform unnecessary opening/closing of the cover (step 808) to return to the state of the cover opening/closing detection. When the accumulated number of opening/closing exceeds three in step 807 ("N" in step 807), the CPU 608 determines that the cover is illegally opened/closed and stores it in the memory 610 (step 809). Then, the CPU 608 informs the product ID that has previously been stored in the memory 610, to the server through the network interface 613 and the external network (step 810), and simultaneously, informs, on the screen, that the digital television receiving apparatus is set in a restricted operation mode in which the user cannot view pay-per-view programs and the like (step 811), and compulsorily restarts the digital television receiving apparatus in the restricted operation mode (step 812) and clears the number of opening/closing of the cover (step 813) to return to the state of the cover opening/closing detection. The restricted operation mode is canceled only after the user calls the management company that manages the server to ask for cancellation of the restricted operation mode.

As described above, according to the fourth embodiment, in the digital television receiving apparatus including the exchangeable decoder module having its own ID, inside the casing surrounded by the casing cover and the casing body, the cover opening/closing detector 609 is constituted by the condenser 704, the charging means 703 for charging the condenser 704, and the switch means 702 for discharging the condenser 704 when the casing cover 701 is opened. The CPU 608 recognizes that the condenser 704 is discharged to detect that the casing cover 701 is opened, and compares the IDs before and after the opening/closing of the casing cover of the decoder module 603 when it is recognized that the casing cover is opened or closed, and simultaneously, stores the number of times the condenser 704 is discharged, in the memory 610. On the basis of the result of the ID comparison and the number of discharging of the condenser 704, the CPU 608 controls the operation of the digital television receiving apparatus. Therefore, it is possible to detect illegal opening/closing of the casing cover while allowing the user to open the cover of the electronic equipment and exchange the device in the casing, whereby illegal use of the equipment can be avoided.

While in this fourth embodiment the operation of the equipment is restricted when the accumulated number of times the cover is illegally opened and closed exceeds three, the accumulated number of opening/closing until the operation is restricted is not restricted to three, and it may be individually determined depending on the equipment. For example, in the case of an equipment having high degree of data secrecy, the operation of the equipment may be restricted by one-time detection of illegality. Conversely, in the case of an equipment having low degree of secrecy, up to five times of illegality detection may be allowed.

Further, while the fourth embodiment is applied to a digital television receiving apparatus, the present invention is applicable to, not only the digital television receiving apparatus, but also all electronic devices that need to prevent leakage of data while allowing the users to open and close the devices.

Furthermore, the present invention can be utilized as a falsification preventing device in an electronic device that never allows the user to open/close the device, by setting the accumulated number of opening/closing until the operation is restricted to one.

The construction of the fourth embodiment in which the cover opening/closing detector 609 comprises the condenser 704, the charging means 703 for charging the condenser 704, and the switch means 702 for discharging the condenser 704 when the casing cover 701 is opened, and the CPU 608 recognizes that the condenser 704 is discharged to detect that the casing cover 701 is opened, can be used as the construction of the cover opening/closing detector 16 of the television receiver according to the first or second embodiment. In this case, the output of the decoding circuit is stopped when the casing cover is opened to prevent illegal copying from occurring, and simultaneously, it is possible to detect that the casing cover is opened when the device is in its power-off state, whereby illegal use of the device can be avoided.

APPLICABILITY IN INDUSTRY

According to the television receiver of the present invention, even when someone opens the casing cover to take out a decrypted video signal from the decoding circuit, the output of the decoding circuit is stopped at the moment when the casing cover is opened, whereby illegal copying is prevented from occurring. When someone who performs maintenance of the television receiver of the present invention inputs a command to compulsorily output the decoding parameters from the at least one button to the decoding control circuit, the operation of the decoding circuit can be carried out even when the casing cover is open, thereby securing maintainability.

Further, by using light for casing cover opening/closing detection, it becomes necessary to generate a code sequence identical to that generated by the code sequence generation circuit, outside the television receiver of the present invention, in order to make the state where the casing cover is virtually closed although it is actually open, and input the code sequence into the light receiver. Therefore, it is advantageous that the above-mentioned state cannot be easily made, and so the present invention is useful as a television receiver or the like that provides copyright protection for a digital video signal or an analog video signal that is obtained by decrypting the encrypted digital video signal.

Further, it is possible to provide a television receiving apparatus which can effectively prevent leakage of data in the digital television receiving apparatus when the user opens the cover of the electronic device to exchange the device in the casing.

The invention claimed is:

1. A tamper-detecting television receiver, comprising:
a casing comprising a casing cover and a casing body,
a video input within said casing for receiving an encrypted digital or analog video signal,
a decoding circuit within said casing for decrypting such encrypted video signal,
a video display unit inside the casing, for displaying an image corresponding to said decrypted video signal,
a cover opening/closing detector for detecting an open or closed state of the casing cover; and
a switch for controlling a power supply voltage that is applied to the decoding circuit, in accordance with an output of the cover opening/closing detector;
wherein power is supplied to the decoding circuit through the switch when the output of the cover opening/closing detector indicates that the casing cover is closed, and the supply of power to the decoding circuit is cut off by the switch when the output of the cover opening/closing detector indicates that the casing cover is opened, and
said cover opening/closing detector comprises:
a condenser means;
a charging means for charging the condenser means;
a discharging means for discharging the condenser means when the casing cover is opened; and
an opening detection means for recognizing that the condenser means is discharged, thereby detecting that the casing cover is opened.

2. A television receiver according to claim 1 wherein said cover opening/closing detector comprises:

a code sequence generation circuit;

a light emitter for converting an electric signal from the code sequence generation circuit into light, thereby generating a light signal;

a light receiver for converting such light signal into a second electric signal;

a light guide on the casing cover for guiding the light outputted from the light emitter to the light receiver, only when the casing cover is closed;

a demodulation circuit for demodulating the second electric signal from the light receiver; and a comparison circuit for comparing the output of the code sequence generation circuit with the output of the demodulation circuit, and outputting a signal indicating that the casing cover is closed, when these outputs are equal to each other.

* * * * *